US009640929B2

(12) United States Patent
Braun

(10) Patent No.: US 9,640,929 B2
(45) Date of Patent: May 2, 2017

(54) VIBRATION-REDUCED BRUSH HOLDER FOR AN ELECTRIC MOTOR

(71) Applicant: Robert Bosch GmbH, Stuttgart (DE)

(72) Inventor: Willy Braun, Neustetten (DE)

(73) Assignee: Robert Bosch GmbH, Stuttgart (DE)

( * ) Notice: Subject to any disclaimer, the term of this patent is extended or adjusted under 35 U.S.C. 154(b) by 420 days.

(21) Appl. No.: 14/355,493

(22) PCT Filed: Oct. 30, 2012

(86) PCT No.: PCT/EP2012/071422
§ 371 (c)(1),
(2) Date: Sep. 26, 2014

(87) PCT Pub. No.: WO2013/068266
PCT Pub. Date: May 16, 2013

(65) Prior Publication Data

US 2014/0319961 A1 Oct. 30, 2014

(30) Foreign Application Priority Data

Nov. 9, 2011 (DE) ........................ 10 2011 085 997

(51) Int. Cl.
*H01R 39/38* (2006.01)
*H02K 13/10* (2006.01)
(Continued)

(52) U.S. Cl.
CPC ........... *H01R 39/381* (2013.01); *H01R 39/40* (2013.01)

(58) Field of Classification Search
CPC .... H02K 13/10; H01R 39/381; H01R 39/385; H01R 39/38; H01R 39/40; H01R 39/41; H01R 39/415
(Continued)

(56) References Cited

U.S. PATENT DOCUMENTS 732,240 A 6/1903 Underwood
2,532,827 A * 12/1950 Thomas .............. H01R 39/381 310/246
(Continued)

FOREIGN PATENT DOCUMENTS

DE 811 597 8/1951
DE 1 488 671 6/1969
(Continued)

OTHER PUBLICATIONS

International Search Report corresponding to PCT Application No. PCT/EP2012/071422, mailed Jan. 2, 2013 (German and English language document) (7 pages).

*Primary Examiner* — Michael Andrews
(74) *Attorney, Agent, or Firm* — Maginot, Moore & Beck LLP

(57) ABSTRACT

A brush holder for an electric motor includes a brush magazine forming a receiving space with a wall surface. A carbon brush having an end face and a side face is arranged in the receiving space. The brush holder also includes a spring, which is in contact with the end face and is configured to press the carbon brush in an extension direction of the receiving space. The brush holder also includes a pressing mechanism arranged on a pivot arm and configured to contact the side face and press the carbon brush by the force of the spring in a pressing direction against the wall surface. The pivot arm has a pivot shaft, to which an inner end of the spring is fastened. The pressing mechanism has a rolling surface configured to roll over the side face of the carbon brush when the carbon brush slides in the extension direction.

19 Claims, 5 Drawing Sheets

(51) Int. Cl.
*H01R 39/40* (2006.01)
*H01R 39/41* (2006.01)

(58) Field of Classification Search
USPC .......................... 310/242, 238–241, 245–246
See application file for complete search history.

(56) References Cited

U.S. PATENT DOCUMENTS

| | | | | |
|---|---|---|---|---|
| 3,526,797 A | | 9/1970 | Jueschke | |
| 3,903,440 A | * | 9/1975 | Paule | B23B 45/001 310/50 |
| 2010/0225198 A1 | * | 9/2010 | Lau | H02K 13/00 310/248 |

FOREIGN PATENT DOCUMENTS

| | | | |
|---|---|---|---|
| DE | 90 03 322 | U1 | 8/1991 |
| DE | 40 14 300 | A1 | 11/1991 |
| DE | 10 2004 035 184 | A1 | 6/2006 |
| DE | 10 2009 025 340 | A1 | 12/2010 |
| GB | 290 002 | A | 5/1928 |
| GB | 392 204 | A | 5/1933 |
| JP | 2003-79108 | A | 3/2003 |
| JP | 2003-199300 | A | 7/2003 |

* cited by examiner

VIBRATION-REDUCED BRUSH HOLDER FOR AN ELECTRIC MOTOR

This application is a 35 U.S.C. §371 National Stage Application of PCT/EP2012/071422, filed on Oct. 30, 2012, which claims the benefit of priority to Serial No. DE 10 2011 085 997.7, filed on Nov. 9, 2011 in Germany, the disclosures of which are incorporated herein by reference in their entirety.

BACKGROUND

The present disclosure relates to a brushholder for an electric motor, in particular a DC motor, which comprises a carbon cartridge which forms an accommodating area with a lateral surface, wherein a carbon brush is arranged in the accommodating area and has an end face and a side face, wherein the brushholder additionally comprises a spring, which rests on the end face and presses the carbon brush in a direction of extent of the accommodating area. The present disclosure furthermore relates to a handheld machine tool comprising an electric motor which has a brushholder according to the disclosure.

Electric tools are usually driven using universal electric motors which have carbon brushes and a commutator, wherein the carbon brushes on the commutator effect commutation, i.e. a change of an energized current branch. Such universal electric motors are DC motors, for example. The carbon brushes are arranged in a carbon cartridge, also referred to as sliding-contact holder, and are positioned on the commutator in the radial direction, on which commutator the electrical contacts to the current branches are arranged. In order to ensure safe electrical contact, said carbon brushes are pressed against the commutator with the aid of a brush spring acting in the radial direction.

In the case of such electric motors, the commutator and the carbon brushes are subject to considerable wear, with the result that they need to be replaced from time to time. A reduction in this service complexity is of great benefit to customers.

A brushholder comprising a carbon brush, a carbon cartridge and a brush spring forms, with its mass and rigidity properties, a vibratory system which is clamped in between the rotor and a housing of the electric motor. The vibrations of the carbon brushes occurring during operation of the electric motor have a substantial influence on wear and influence the contact-making and commutation response of the motor directly.

Forces exciting this vibratory system can be introduced both from the rotor and from the housing. In this case, all of the deviations of an optimal concentric true running of the rotor with respect to the carbon brushes in the radial and axial directions have the effect of exciting vibrations. The reasons for this are, for example, irregularities of the commutator, eccentricities in the rotor, imbalance, bearing play, etc.

The quality of the guidance of the carbon brush in the carbon cartridge also has a considerable influence on the vibration response. This is because the carbon brush is arranged in its carbon cartridge with a small amount of play in order to compensate for component tolerances so that it can slide in the carbon cartridge. Although this play is small, it is sufficient to cause the carbon brush to reel, i.e. to cause the carbon brush to vibrate within the accommodating area of the carbon cartridge. In the process, the carbon brush is at least partially lifted off from the commutator, as a result of which uneven abrasion occurs. In addition, this may result in sparking, i.e. in the formation of an arc between the carbon brush and the commutator, since the current density increases owing to the reduced contact area. Owing to the severe thermokinetic loading, the carbon brush and the commutator are subjected to very severe wear in the case of sparking.

Particularly high levels of excitation of vibrations of the commutation system are caused in the case of impact hammer drills and jackhammers, which naturally have high vibration amplitudes. By virtue of the introduction of anti-vibration handles, the damping influence of the operator on the machine vibrations has additionally been reduced, with the result that the vibration input into the commutation system has rather tended to increase in the case of new device generations.

The excitations lead not only to axial, radial and tangential vibration amplitudes of the carbon brushes relative to the commutator and therefore to excessive wear, but also impair the true running of the commutator, with the result that fluctuations in speed can arise and the control quality of the speed regulation is impaired. In addition, the impairment of the commutation efficiency also results in an overall impaired motor efficiency. Furthermore, an increased amount of complexity in terms of interference suppression owing to relatively poor EMC (electromagnetic compatibility) values should be expected.

The document DE 10 2009 025 340 A1 discloses an electric hand tool comprising a brushholder for accommodating a sliding brush which comprises a spiral spring. The spiral spring is fixed in place with an inner end such that a spring pressing force relative to the brushholder can be generated by rotation of the spiral spring. With the outer end of the spiral spring, said spiral spring rests on an inclined or tilted top bevel of the sliding brush in such a way that the spiral spring effects a spring pressure which has not only a radial component, but also a tangential and an axial component. As a result, tilting of the sliding brush to and fro within the accommodating area of the brushholder is reduced.

SUMMARY

The disclosure is based on the object of improving the brushholder and therefore providing an inexpensive brushholder in which the relative movement of the carbon brush with respect to the commutator is further reduced or is avoided, with the result that the carbon brush vibrates to a lesser extent, and the commutation is improved.

The object is achieved by a brushholder for an electric motor, in particular a DC motor, which comprises a carbon cartridge which forms an accommodating area with a lateral surface, wherein a carbon brush is arranged in the accommodating area and has an end face and a side face, wherein the brushholder additionally comprises a spring, which rests on the end face and presses the carbon brush in a direction of extent of the accommodating area, wherein the brushholder furthermore comprises a pressing means, which rests on the side face and presses the carbon brush, by means of the force of the spring, in a pressing direction against the lateral surface.

In accordance with the disclosure, the brushholder has a pressing means which rests on the side face of the carbon brush and also presses said carbon brush, by means of the same spring which presses the carbon brush in the direction of extent of the accommodating area, against the lateral surface delimiting the accommodating area. Therefore, the carbon brush is guided in the accommodating area without play. The spring, which is conventionally provided in any case, is therefore at the same time used, in accordance with the disclosure, to fix and guide the carbon brush in a force-fitting manner in the accommodating area. The moment and the reaction force of the spring are in this case transmitted via the pressing means. The brushholder according to the disclosure therefore does not require an additional spring for causing the carbon brush to rest, without play, in the carbon cartridge. It can be produced easily, robustly and inexpensively.

Owing to the restoring force of the spring, said spring compensates for changes in distance between the carbon brush and the carbon cartridge and/or a commutator of an electric motor equipped with the brushholder which arise during operation of the electric motor owing to irregularities, untrue running, bearing play, temperature fluctuations, etc., for example. As a result, reeling of the carbon brush in the accommodating area is reduced or even avoided, and the relative movements between the carbon brush and the commutator are restricted or even prevented. The commutator and the carbon brush are subject to less wear, with the result that the carbon life and the commutator life and therefore a required service interval for the brushholder are extended. At the same time, the commutation efficiency is improved and the thermal loading on the commutator and the electromagnetic interference caused during the commutation are reduced. Therefore, the complexity involved with interference suppression can be reduced.

Since the pressing means is spring-loaded, the brushholder according to the disclosure furthermore also enables sliding of the carbon brush in the direction of extent in the accommodating area of the carbon cartridge, with the result that neither the fitting of the carbon brush in the accommodating area nor the pressing of the carbon brush against the commutator are impeded.

It is preferable that the direction of extent is a radial direction of the electric motor, so that the carbon brush is positioned on a commutator of the electric motor in the radial direction of the electric motor. The spring is preferably in the form of a spiral spring, wherein further preferably an outer end of the spring rests on the end face. The end face is preferably provided transversely to the direction of extent. In this embodiment, the spring acts predominantly in the radial direction of the electric motor.

The pressing means is preferably arranged on a pivoting arm, wherein the pivoting arm further preferably has a pivoting shaft, on which an inner end of the spring is fixed. The inner end of the spring is preferably fixed on the pivoting shaft in rotationally secure fashion, for example by virtue of it being inserted into a groove provided in the pivoting shaft. In principle, however, fixing by means of screws, rivets or the like is also possible.

The pivoting shaft extends in the direction of a pivot axis, wherein it is furthermore preferred for the pivoting arm to be mounted pivotably about the pivot axis. Since the spring is fixed on the pivoting shaft, a pretensioning of the pivoting arm can be produced by rotation of the spring. In this embodiment, the pressing means is pressed against the side face of the carbon brush by the reaction torque of the spiral spring with a reaction force in the pressing direction, with the result that the carbon brush is pressed against the lateral surface in the pressing direction. Since the pressing means is supported on the carbon brush, the carbon brush is caused to rest on the carbon cartridge with pretensioning without any play. This results in an vibration-damping friction. The reaction torque of the spring is in this case therefore not only used for holding and guiding the carbon brush in the direction of extent, but also for force-fitting fixing of the carbon brush in the pressing direction.

The pressing means is preferably arranged at that end of the carbon brush which is opposite the pressing face of the carbon brush, so that it is arranged as close as possible to a contact face of the carbon brush on which the carbon brush rests on a commutator of the electric motor. As a result, it is pressed against the lateral surface of the accommodating area close to the contact area, so that a relative movement between the carbon brush and the accommodating area is prevented to an increased extent there.

For this, the pivoting arm preferably has a lever arm between the pivoting shaft and the pressing means. Particularly preferably, the pivoting arm is in the form of a toggle lever. It is further preferred for the pressing means to be mounted rotatably about an axis of rotation. Preferably, it is in the form of a roller. In this case, the pressing means furthermore preferably has a rolling surface, which rolls on the side face of the carbon brush as the carbon brush slides in the direction of extent. In this embodiment, the pressing means virtually does not impede or damp the radial movement of the carbon brush since it can roll on the side face of the carbon brush with relatively low friction.

In addition, it is preferable that a damping means, in particular a spring washer, is arranged between the pressing means and the lever arm, which damping means damps vibrations of the carbon brush in the direction of extent.

In a preferred embodiment, the pressing direction is provided transversely to the direction of extent. Particularly preferably, the pressing direction has a tangential and/or an axial directional component of the electric motor. Owing to the fact that the carbon brush rests on the lateral surface of the carbon cartridge without play, the vibrations of the carbon brush in the axial and/or in the tangential direction are therefore reduced.

In a further preferred embodiment, the pressing means and/or the carbon brush and/or the carbon cartridge have angled and/or wedge-shaped function faces which have the effect that the carbon brush is caused to rest and is fixed on the carbon cartridge not only in the tangential direction but also in the axial direction.

The carbon cartridge preferably has an opening through which the pressing means engages. As a result, the pressing means rests on the carbon brush. A groove, a slot or a cut-out in the carbon cartridge is preferred as the opening. Particularly preferably, the carbon cartridge has an open wall, with the result that it is in the form of an L or U in cross section, for example, and the accommodating area is open on its side facing the pressing means. Owing to the fact that it rests on the lateral surface of the carbon cartridge on one side without play and owing to the cross-sectional profile of the carbon cartridge which is open on the other side, there is virtually no risk of the carbon brush becoming stuck as a result of grains of dust arranged between said carbon brush and the carbon cartridge. At the same time, the carbon brush is cooled very well owing to the open cross-sectional profile.

In addition, a carbon cartridge with an open cross-sectional profile can be produced very easily and with little complexity in terms of material and accuracy, since complete guidance for the carbon brushes does not need to be provided on that side of the carbon cartridge which faces the pressing means. Preferably, said carbon cartridge is manufactured from a metal or a metal alloy, in particular in the form of a stamped and bent part. In this embodiment, it can be produced very inexpensively, for example from sheet metal. Since, in contrast to a carbon cartridge manufactured from a plastic, a carbon cartridge manufactured from a metal or a metal alloy does not require any draft angles, the carbon cartridge manufactured from a metal or a metal alloy can additionally be produced with narrow tolerances. However, a carbon cartridge manufactured from a plastic is also suitable for the brushholder according to the disclosure since the brushholder according to the disclosure enables improved cooling of the carbon brush since the thermal loading on the commutator is reduced and because the carbon cartridge can be manufactured with greater tolerances owing to its open cross section.

The side face is preferably provided transversely to the end face. In principle, however, another arrangement is also conceivable, in which the side face has an angle to the end face. If the pressing direction is provided transversely to the side face, the result is that in addition to the force components exerted on the carbon brush by means of the pressing means in the tangential and/or axial direction, a force component in the direction of extent can also be transmitted to the carbon brush. Owing to the choice of geometry of the carbon brush and/or the pressing direction, therefore, the magnitude of the force component which acts in the respective direction can be matched.

In a preferred embodiment, the axis of rotation and the pivot axis are provided parallel to one another. Particularly preferably, they are provided transversely to the direction of extent. In principle, the arrangement of the axis of rotation and the pivot axis can be selected as desired, however, and can be matched primarily to the spatial conditions available.

The accommodating area is preferably approximately in the form of a right-parallelepiped. Furthermore, the carbon brush in this embodiment is likewise preferably provided in the form of a right-parallelepiped. In principle, however, other geometries are also possible, for example a round or oval accommodating area and a carbon brush shaped corresponding thereto.

In order to enable modular manufacture and simple handling during fitting of the brushholder, it is furthermore preferable that the carbon cartridge and the pivoting arm are arranged on one housing component. In addition, the brushholder preferably has a contact plug for connection of an electrical conductor to the carbon brush.

The object is furthermore achieved by an electric motor, in particular by a DC motor, comprising a brushholder according to the disclosure. The electric motor preferably has a rotor comprising a commutator, wherein the carbon brush rests on a contact area on the commutator and makes electrical contact therewith. The contact area is preferably arranged approximately parallel to the end face and at an end of the carbon brush which is opposite the end face. The electric motor has improved motor efficiency, lower speed fluctuations and improved EMC values in comparison with an electric motor comprising a conventional brushholder, which does not have a second spring for reducing the reeling of the carbon brush. Owing to an extended carbon life, it also has extended service intervals.

The object is furthermore achieved by a handheld machine tool comprising such an electric motor. The handheld machine tool is preferably a drill or a hammer drill or jackhammer.

The brushholder according to the disclosure makes it possible to introduce axial and tangential forces close to the contact area of the carbon brush on the commutator of the electric motor in a targeted manner. As a result, a relative movement of the carbon brush with respect to the carbon cartridge and with respect to the commutator is prevented very effectively. Since the carbon brush vibrates to a lesser extent, the commutation efficiency is markedly improved and the carbon life and commutator life are considerably increased.

BRIEF DESCRIPTION OF THE DRAWINGS

The disclosure will be described below with reference to figures. The figures are merely by way of example and do not restrict the general concept of the disclosure.

FIG. 3 shows the brushholder according to the disclosure shown in FIG. 1, wherein FIG. 3 shows a section D-D from FIG. 4 in a plan view.

DETAILED DESCRIPTION

Figure 1:
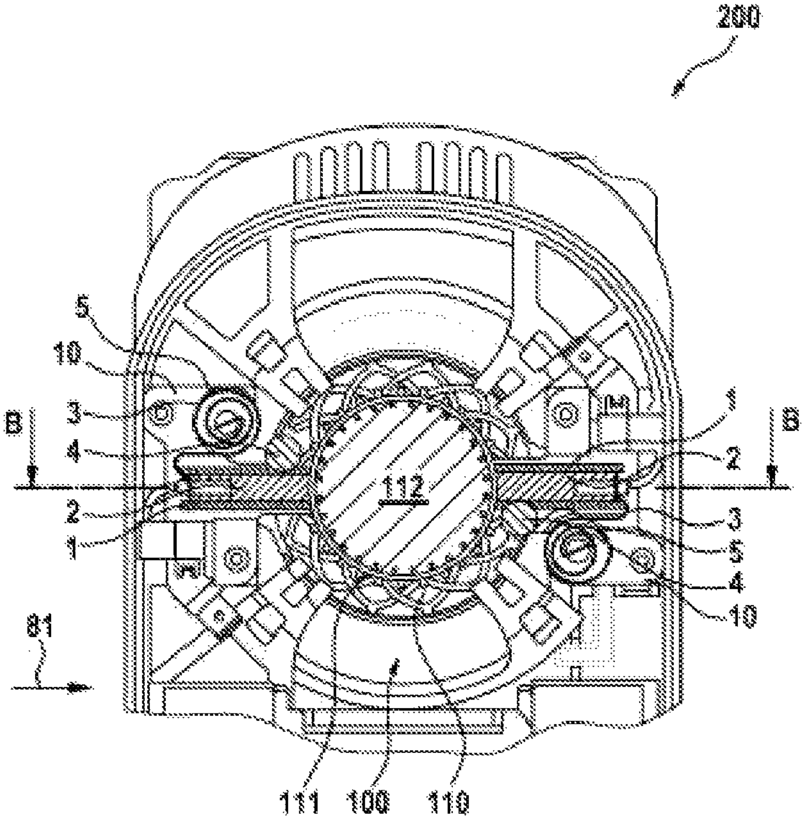
FIG. 1 shows a section E-E through a commutator of a rotor of an electric motor comprising two brushholders according to the disclosure of a hammer drill as shown in FIG. 2 in a plan view.
Figure 2:
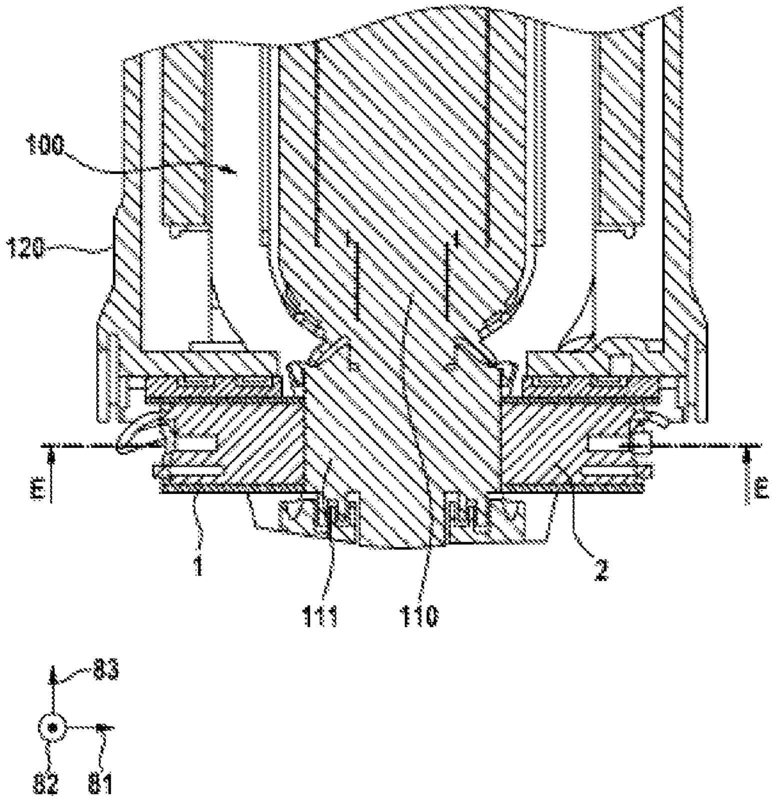
FIG. 2 shows a longitudinal section B-B through the rotor of the hammer drill shown in FIG. 1.

FIG. 1 and FIG. 2 each show a section through a hammer drill 200, wherein FIG. 1 shows a section at the level of the commutator 111 in a plan view, and FIG. 2 shows a longitudinal section through the motor housing 120.

The commutator 111 is arranged on a rotor shaft 112 of a rotor 110 of an electric motor 100 which drives the hammer drill 200. In order to change current branches of the rotor 110, a supply voltage is applied to the commutator 111 via two carbon brushes 2. The carbon brushes 2 are each arranged in a carbon cartridge 1 of a brushholder 10. They are held by means of a spring 3, which in this case is in the form of a spiral spring, and are pressed by means of the spring 3 in a direction of extent 81 of an accommodating area 12 formed by the carbon cartridge 1 (see FIG. 3). The spring force of the spring 3 causes the carbon brush 2 to be pressed against the commutator 111 as necessary and, in the event of wear of the carbon brush 2, additionally effects continuous tracking of the carbon brush 2 in the direction of extent 81.

In this case, the direction of extent 81 is the radial direction of the electric motor 100. In this direction 81, the carbon brush 2 has its greatest degree of freedom of movement. However, conventionally, vibrations of the carbon brush 2 in the accommodating area 12 can arise during operation of an electric motor 100, inter alia owing to a required play S (see FIG. 4) between the carbon cartridge 1 and the carbon brush 2. Owing to this play S, the carbon brush 2 also has degrees of freedom of movement in the tangential direction 82 and the axial direction 83 of the electric motor 100 in the carbon cartridge 1. Conventionally, therefore, different vibration excitations can effect vibratory movements of the carbon brush 2 in all three spatial directions.

In order to reduce these vibratory movements or even to prevent them and, as a result, to improve the quality of the commutation, the brushholder 10 according to the disclosure comprises a pressing means 4, which presses the carbon brush 2 against a lateral surface 13 (see FIG. 3) of the accommodating area 12. The pressing means 4 is arranged on a pivoting arm 5.

Figure 3:
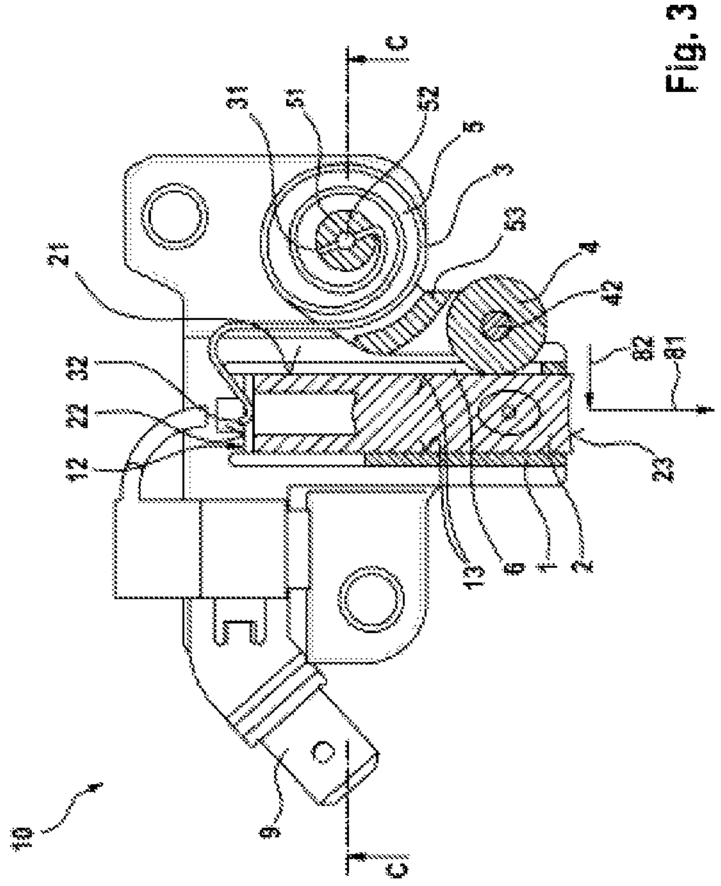
Figure 4:
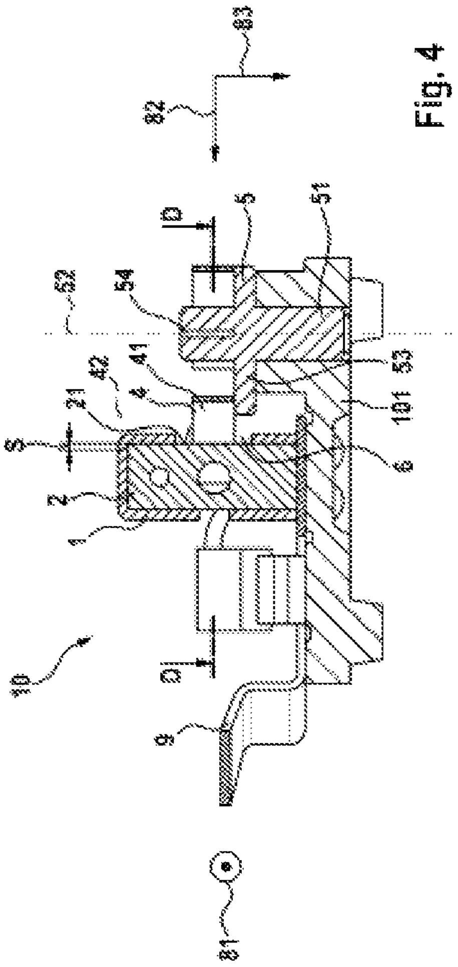
FIG. 4 shows a further section C-C through the brushholder according to the disclosure from FIG. 3 in a side view.

FIG. 3 and FIG. 4 show the brushholder 10 according to the disclosure, in each case in a sectional illustration.

The brushholder 10 according to the disclosure comprises a carbon cartridge 1, which forms an accommodating area 12. The accommodating area 12 extends in a direction of extent 81 and is delimited by a lateral surface 13. A carbon brush 2 is arranged in the accommodating area 12. In the present exemplary embodiment, the carbon brush 2 and the carbon cartridge 1 are approximately rectangular in cross section.

Furthermore, the brushholder 10 comprises a pivoting arm 5, which has a pivoting shaft 51. The pivoting shaft 51 extends along a pivot axis 52 in the axial direction 83 and is mounted on a housing component 101 rotatably about the pivot axis 52, with the carbon cartridge 1 also being fixed on said housing component.

Furthermore, the brushholder 10 comprises a contact plug 9 for connection of an electrical conductor (not shown), which can be electrically connected to the carbon brush 2.

The pivoting arm 5 has a lever arm 53, at whose end a pressing means 4 is mounted rotatably about an axis of rotation 42. In the present exemplary embodiment, the axis of rotation 42 also extends in the axial direction 83. The pressing means 4 is in the form of a roller and has a rolling face 41.

An opening 6, which in this case is in the form of a groove, is provided in the carbon cartridge 1. The opening 6 extends virtually over the entire longitudinal extent of the carbon cartridge 1. The pressing means 4 can be caused to rest with its rolling face 41 on the carbon brush 2 through the opening 6.

In order to press the carbon brush 2 in the direction of extent 81 against the commutator 111 (see FIGS. 1 and 2) of the electric motor 100, a spring 3 is provided which in this case is in the form of a spiral spring. The terms spring 3 and spiral spring will be used synonymously in the text which follows. The spiral spring has an outer end 32, with which it rests on an end face 22 of the carbon brush 2. The end face 22 of the carbon brush 2 is provided at that end of the carbon brush 2 which is remote from the commutator 111. Therefore, the carbon brush 2 is pressed by means of the spring 3 in the direction of extent 81, which is the radial direction 81 of the electric motor 100.

Furthermore, the spiral spring 3 has an inner end 31, which is fixed in rotationally fixed fashion on the pivoting shaft 51. In this case, for this purpose it is inserted into a groove 54 which is provided in the pivoting shaft 51.

By rotation of the spring 3, therefore, pretensioning can be produced which presses the pressing means 4 in a pressing direction 82 with its rolling face 41 against a side face 21 of the carbon brush 2, with the result that said carbon brush is caused to rest on the lateral surface 13 of the accommodating area 12 without play. In this case, the pressing means 4 is provided at an end of the carbon brush 2 which is opposite the end face 22. As a result, it is provided very close to a contact area 23 of the carbon brush 2 with respect to the commutator 111, with the result that it very effectively prevents a vibrating movement of the carbon brush 2 in the accommodating area 12 close to the contact area 23.

The pressing direction 82 is in this case provided transversely to the direction of extent 81 and corresponds to the tangential direction 82 of the electric motor 100 (see FIGS. 1 and 2). In principle, however, embodiments are also conceivable in which the pressing direction also has a directional component in the axial direction 83 of the electric motor 100.

In the case of tracking of the carbon brush 2, the pressing means 4 does not impede the carbon brush 2 since the rolling face 41 rolls on the side face 21.

Figure 5A:
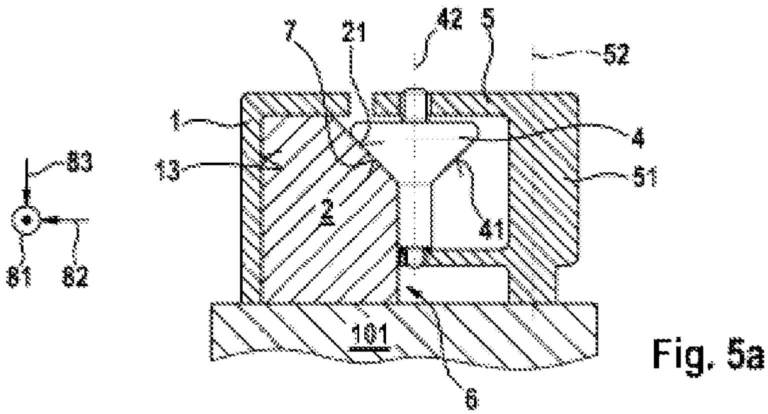
FIG. 5 shows, schematically, a plurality of further embodiments of the brushholders according to the disclosure.
Figure 5B:
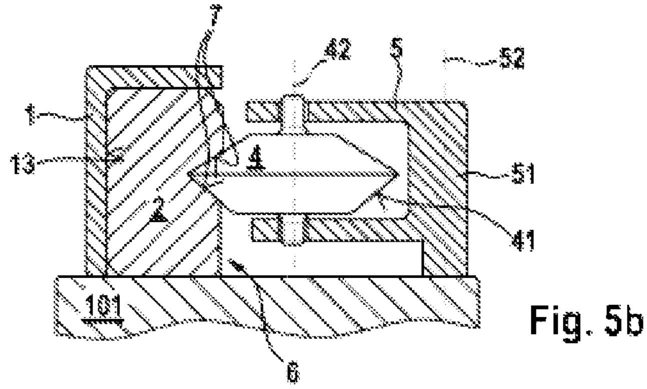
Figure 5C:
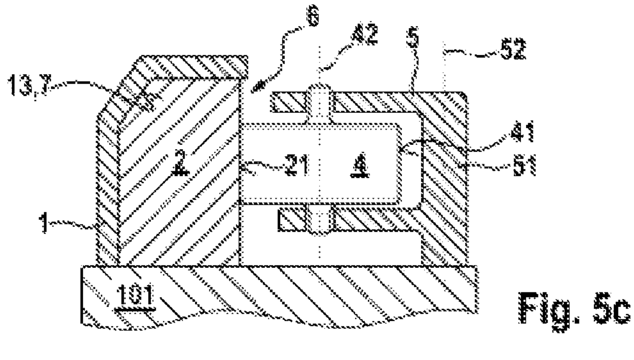

FIG. 5 shows, schematically, a plurality of further embodiments of brushholders 10 according to the disclosure.

The brushholders shown in FIGS. 5(*a*)-(*c*) differ from one another and from the embodiment shown in FIGS. 3 and 4 primarily owing to the differently configured function faces 7 on the carbon brush 2, the pressing means 4 and/or the carbon cartridge 1. The function faces 7 have the effect that the carbon brush 2 is fixed in the carbon cartridge 1 both in the axial direction 83 and in the tangential direction 82.

In the exemplary embodiments shown in FIGS. 5(*a*) and (*b*), the carbon brush 2 and the pressing means 4 each have a function face 7 for this purpose, which function faces interact with one another. To be precise, the side face 21 and the rolling face 41 have, in FIG. 5(*a*), a bevel and, in FIG. 5(*b*), a wedge, which bevel and wedge form the function faces 7. In the exemplary embodiment shown in FIG. 5(*c*), on the other hand, the carbon cartridge 1 and the carbon brush 2 each have a function face 7 in the form of a bevel, which function faces correspond to one another and interact with one another.

The invention claimed is:

1. A brushholder for an electric motor comprising:

a carbon cartridge forming an accommodating area with a lateral surface, wherein a carbon brush arranged in the accommodating area has an end face and a side face;

a spring configured to rest on the end face and press the carbon brush in a direction of extent of the accommodating area; and a pressing mechanism arranged on a pivoting arm and configured to rest on the side face and press the carbon brush, by a force of the spring, in a pressing direction against the lateral surface, wherein the pivoting arm has a pivoting shaft on which an inner end of the spring is fixed, and wherein the pressing mechanism has a rolling surface configured to roll on the side face of the carbon brush as the carbon brush slides in the direction of extent.

2. The brushholder as claimed in claim 1, wherein the end face is transverse to the direction of extent.

3. The brushholder as claimed in claim 1, wherein the spring is a spiral spring.

4. The brushholder as claimed in claim 1, wherein the spring has an outer end configured to rest on the end face.

5. The brushholder as claimed in claim 1, wherein the pivoting shaft is configured to extend in a direction of a pivot axis about which the pivoting arm is mounted pivotably.

6. The brushholder as claimed in claim 1, wherein the pressing mechanism is arranged on an end of the carbon brush opposite the end face.

7. The brushholder as claimed in claim 1, wherein the pressing mechanism is mounted rotatably about an axis of rotation.

8. The brushholder as claimed in claim 1, wherein the pressing direction is transverse to the direction of extent.

9. The brushholder as claimed in claim 1, wherein the carbon cartridge has an opening through which the pressing mechanism engages.

10. The brushholder as claimed in claim 1, wherein the carbon cartridge and the pivoting arm are arranged on a housing component.

11. The brushholder as claimed in claim 1, wherein at least one of the carbon brush, the pressing mechanism, and the carbon cartridge has a function face configured to fix the carbon brush in the carbon cartridge both in an axial direction and in a tangential direction.

12. The brushholder as claimed in claim 11, wherein the side face and the rolling surface have function faces configured to interact with one another.

13. The brushholder as claimed in claim 12, wherein the side face and the rolling face have at least one wedge or one bevel.

14. The brushholder as claimed in claim 11, wherein the carbon cartridge and the carbon brush each have a function face in the form of a bevel, said function faces configured to correspond to one another and interact with one another.

15. The brushholder as claimed in claim 1, wherein the electric motor is a DC motor.

16. An electric motor, comprising:

a brushholder, including:

a carbon cartridge forming an accommodating area with a lateral surface, wherein a carbon brush arranged in the accommodating area has an end face and a side face;

a spring configured to rest on the end face and press the carbon brush in a direction of extent of the accommodating area; and a pressing mechanism arranged on a pivoting arm and configured to rest on the side face and press the carbon brush, by a force of the spring, in a pressing direction against the lateral surface, wherein the pivoting arm has a pivoting shaft on which an inner end of the spring is fixed, and wherein the pressing mechanism has a rolling surface configured to roll on the side face of the carbon brush as the carbon brush slides in the direction of extent.

17. The electric motor of claim 16, wherein the electric motor is in a handheld machine tool.

18. The electric motor as claimed in claim 17, wherein the handheld machine tool is one of a drill, a hammer drill, and a jackhammer.

19. The electric motor as claimed in claim 16, wherein the electric motor is a DC motor.

* * * * *